United States Patent
Tatematsu et al.

(10) Patent No.: US 7,963,353 B2
(45) Date of Patent: Jun. 21, 2011

(54) POWER OUTPUT DEVICE OF HYBRID VEHICLE

(75) Inventors: Kazutaka Tatematsu, Nagoya (JP); Ryoji Mizutani, Nishikamo-gun (JP); Yasuhiro Endo, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 371 days.

(21) Appl. No.: 12/083,615

(22) PCT Filed: Oct. 12, 2006

(86) PCT No.: PCT/JP2006/320805
§ 371 (c)(1),
(2), (4) Date: Apr. 11, 2008

(87) PCT Pub. No.: WO2007/043706
PCT Pub. Date: Apr. 19, 2007

(65) Prior Publication Data
US 2009/0242286 A1  Oct. 1, 2009

(30) Foreign Application Priority Data

Oct. 13, 2005 (JP) ................................. 2005-299094

(51) Int. Cl.
*B60K 6/42* (2007.10)
*F16M 5/00* (2006.01)
(52) U.S. Cl. .................................................. 180/65.22
(58) Field of Classification Search ............... 180/65.21, 180/65.22, 65.23, 65.265, 65.275, 65.285; 903/915, 920, 922, 940, 942
See application file for complete search history.

(56) References Cited

U.S. PATENT DOCUMENTS

| | | | |
|---|---|---|---|
| 4,632,211 A | 12/1986 | Le Salver et al. | |
| 5,465,208 A | 11/1995 | Mochizuki et al. | |
| 6,371,229 B1 * | 4/2002 | Kakiuchi | 180/65.25 |
| 6,382,341 B1 | 5/2002 | Hashimoto et al. | |
| 7,406,939 B2 * | 8/2008 | Asahara et al. | 123/192.1 |
| 7,621,359 B2 * | 11/2009 | Kano et al. | 180/65.21 |
| 7,722,498 B2 * | 5/2010 | Kawasaki et al. | 477/3 |
| 2003/0034186 A1 * | 2/2003 | Morita et al. | 180/65.1 |
| 2003/0200761 A1 * | 10/2003 | Funahashi et al. | 62/228.4 |
| 2004/0124332 A1 | 7/2004 | Takenaka et al. | |

(Continued)

FOREIGN PATENT DOCUMENTS

EP  0 108 000 A1  5/1984

(Continued)

OTHER PUBLICATIONS

Korean Office Action dated Jan. 8, 2010 (3 pages).

*Primary Examiner* — Hau V Phan
*Assistant Examiner* — Jacob Meyer
(74) *Attorney, Agent, or Firm* — Sughrue Mion, PLLC (57) ABSTRACT

A trans axle includes motor generators with central rotation axes of respective rotors arranged coaxially, a power split device arranged coaxially with the central rotation axis of a crank shaft and between motor generators, and a power control unit controlling the motor generators. The power control unit is arranged such that a reactor is positioned at least on one side and a smoothing capacitor is positioned on the other side of the central rotation axis of motor generator. The motor generators, the power split device and the power control unit are housed and integrated in a metal case, and fixed on a body of a vehicle (1000) by an engine mount.

4 Claims, 6 Drawing Sheets

U.S. PATENT DOCUMENTS

| | | | |
|---|---|---|---|
| 2004/0165868 A1* | 8/2004 | Sato et al. | 388/804 |
| 2004/0226761 A1* | 11/2004 | Takenaka et al. | 180/65.1 |
| 2005/0037883 A1* | 2/2005 | Motoike et al. | 475/5 |
| 2005/0038576 A1* | 2/2005 | Hara et al. | 701/22 |
| 2005/0200061 A1* | 9/2005 | Nemoto | 267/140.14 |
| 2006/0064998 A1* | 3/2006 | Funahashi et al. | 62/228.4 |
| 2006/0169502 A1* | 8/2006 | Kano et al. | 180/65.2 |
| 2006/0224360 A1* | 10/2006 | Kishimoto | 702/183 |
| 2007/0246635 A1* | 10/2007 | Nakajima et al. | 248/637 |
| 2007/0272455 A1* | 11/2007 | Lang et al. | 180/65.2 |
| 2008/0258569 A1* | 10/2008 | Kano et al. | 310/51 |
| 2009/0014222 A1* | 1/2009 | Tatematsu et al. | 180/65.2 |
| 2009/0030568 A1* | 1/2009 | Amano et al. | 701/22 |
| 2009/0054190 A1* | 2/2009 | Kim et al. | 475/5 |
| 2009/0114462 A1* | 5/2009 | Tahara et al. | 180/65.21 |
| 2009/0250271 A1* | 10/2009 | Komatsu et al. | 180/65.6 |
| 2009/0277705 A1* | 11/2009 | Ichikawa | 180/65.275 |

FOREIGN PATENT DOCUMENTS

| | | |
|---|---|---|
| EP | 1 034 956 A2 | 9/2000 |
| JP | 5-312086 A | 11/1993 |
| JP | 1042407 A | 2/1998 |
| JP | 2001-119961 A | 4/2001 |
| JP | 2002316541 A | 10/2002 |
| JP | 2004215355 A | 7/2004 |
| JP | 2004-284447 A | 10/2004 |
| JP | 2004343845 A | 12/2004 |
| JP | 200532830 A | 2/2005 |
| JP | 200573392 A | 3/2005 |
| JP | 2005-150517 A | 6/2005 |
| JP | 2005-178479 A | 7/2005 |
| JP | 2005256933 A | 9/2005 |
| RU | 2100221 C1 | 12/1997 |
| WO | 2005/000618 A1 | 1/2005 |

* cited by examiner

POWER OUTPUT DEVICE OF HYBRID VEHICLE

TECHNICAL FIELD

The present invention relates to a power output device of a hybrid vehicle and, more specifically, to a power output device of a hybrid vehicle having a power control unit for controlling driving of a motor and a motor housed in one case.

BACKGROUND ART

Recently, a hybrid vehicle has been attracting attention as a vehicle that attains both environmental performance and traveling performance. A hybrid vehicle uses, as a power source, a motor driven by a DC power source through an inverter, in addition to a conventional engine. Specifically, a power source is obtained by driving the engine and, in addition, a DC voltage from a DC power source is converted to an AC voltage by the inverter, and a power source is obtained as the motor is rotated by the converted AC voltage.

In most of the currently available hybrid vehicles, the power output device generating the power for driving the vehicle has such a structure that a large, box-shaped case of the inverter is fixed on the chassis, and a motor case (trans axle) is arranged therebelow. Considering a power output device of a hybrid vehicle that can be mounted on as wide a variety of models as possible, a structure having two cases is disadvantageous in component standardization, as the arrangements must be optimized model by model.

In principle, it is desirable to put units that require combined operation into one case for integration. In view of the foregoing, Japanese Patent Laying-Open No. 2004-343845 discloses a drive unit for a hybrid vehicle in which motors and inverters are integrated.

Now, for a hybrid vehicle, an approach of boosting a DC voltage from a DC power source by a boost converter and supplying the boosted DC voltage to the inverter has been proposed. This is to attain higher output of the motor and to improve energy efficiency.

Therefore, it is apparent from the viewpoint of cooperation that, if the boost converter is integrated with the motor as in the case of the inverter, better effect of component standardization and size reduction of the device can be attained.

The drive unit for a hybrid vehicle disclosed in Japanese Patent Laying-Open No. 2004-343845, however, is directed only to a simple structure having the inverter mounted on the motor, and this laid-open application neither discloses nor suggests any structure in which the boost converter is integrated additionally.

The boost converter is generally formed by combining a reactor and a chopper circuit including a switching element. Specifically, to the reactor, a switched current flows from the DC power source dependent on ON/OFF of the switching element, and the power is accumulated. The reactor supplies the accumulated electric power to the inverter side, dependent on ON/OFF of the switching element. The boost converter attains boosting by repeating such an operation.

In the boosting operation, when the switched current flows through the coil of the reactor, vibration occurs due to a magnetic flux circulating through the core. The vibration may possibly propagates to the body, resulting in noise in the vehicle interior. Therefore, in a conventional power output device, separate means for absorbing reactor vibration has been provided (for example, see Japanese Patent Laying-Open Nos. 2005-32830 and 2005-73392).

From the foregoing, when the boost converter is to be integrated with the motor, sufficient consideration must be given not only to the reduction in size of the device but also to the provision of the reactor vibration absorbing means.

Therefore, the present invention was made in order to solve these problems and its object is to provide a power output device of a hybrid vehicle having an integrated motor driving system and capable of absorbing reactor vibration of the motor driving system.

DISCLOSURE OF THE INVENTION

The present invention provides a power output device of a hybrid vehicle outputting power to a driving shaft, including: an engine generating power using fuel combustion energy as a source; a power transmission device combining the power generated by the engine with power generated by a rotating electrical machine and transmitting to the driving shaft; a power control unit including a switching element and a reactor, for power conversion between a DC electric power from a power source and an AC electric power driving and controlling the rotating electrical machine by a switching operation of the switching element; a case coupled to the engine to allow transmission of vibration, and housing the power transmission device and the power control unit; and an anti-vibration device suspending the engine and the case on a vehicle body, allowing absorption of relative vibration between the engine and the vehicle body.

According to the power output device of a hybrid vehicle described above, the reactor is integrated with the motor case and, therefore, the reactor vibration generated by the switching current at the time of conduction is absorbed, together with engine vibration, by the anti-vibration device of the engine. Therefore, less reactor vibration is propagated to the vehicle body and, as a result, noise in vehicle interior can be reduced. Further, it is unnecessary to newly provide any means for absorbing reactor vibration, and further reduction in device size is promoted.

Preferably, the power transmission device includes first and second rotating electrical machines driven by the power source and generating power, and a power split device mechanically distributing an output of the engine to the first rotating electrical machine and the driving shaft. The power control unit includes first and second inverters provided corresponding to the first and second rotating electrical machines, and a voltage converter having the switching element and the reactor, performing voltage conversion between the power source and the first and second inverters, by the switching operation of the switching element.

In the power output device of a hybrid vehicle described above, the reactor vibration generated at the time of voltage conversion can be absorbed by the anti-vibration device of the engine. Therefore, less reactor vibration is propagated to the vehicle body and, as a result, noise in vehicle interior can be reduced.

Preferably, a current switched by the switching element flows through the reactor. The anti-vibration device has an elastic body allowing vibration coupled between the engine and the case, and the vehicle body, and provided such that direction of vibration of the elastic body is approximately the same as the direction of the reactor vibration when power is conducted.

In the power output device of a hybrid vehicle described above, the reactor vibration generated at the time of power conduction can be absorbed efficiently by the anti-vibration device of the engine.

Preferably, the anti-vibration device is provided such that the elastic body and the reactor vibrate approximately on one same line.

In the power output device of a hybrid vehicle described above, the reactor vibration generated at the time of power conduction can be absorbed efficiently by the anti-vibration device of the engine.

Preferably, the anti-vibration device is provided such that the direction of vibration of the elastic body is approximately the same as the direction of vibration of the reactor when power is conducted and the direction of vibration of the engine.

In the power output device of a hybrid vehicle described above, the vibration damping force of the anti-vibration device can be fully made use of.

According to the present invention, as the reactor is integrated with the motor case, the reactor vibration generated when the switched current is conducted can be absorbed, together with engine vibration, by the anti-vibration device of the engine. Therefore, less reactor vibration is propagated to the vehicle body and, as a result, noise in vehicle interior can be reduced. Further, it is unnecessary to newly provide any means for absorbing reactor vibration, and further reduction in device size is promoted.

BEST MODES FOR CARRYING OUT THE INVENTION

In the following, embodiments of the present invention will be described in detail with reference to the figures. In the figures, the same reference characters denote the same or corresponding portions.

Figure 1:
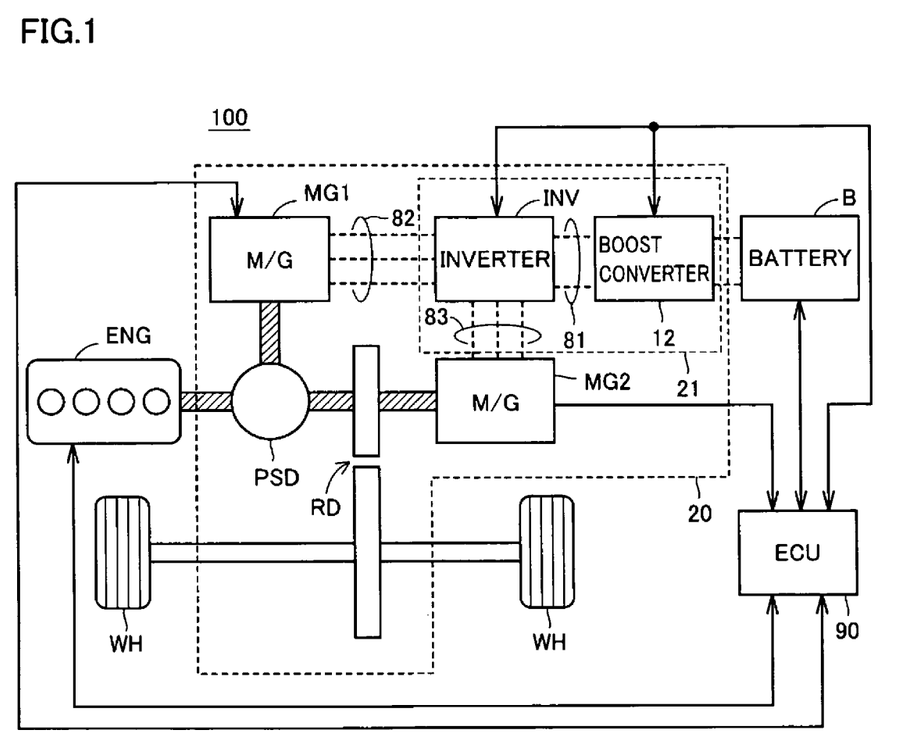
FIG. 1 is a block diagram representing an overall configuration of a hybrid power output device in accordance with an embodiment of the present invention.

FIG. 1 is a block diagram representing an overall configuration of a power output device of a hybrid vehicle (hereinafter referred to as a "hybrid power output device") in accordance with an embodiment of the present invention. In the present embodiment, the hybrid vehicle will be described as a series/parallel hybrid vehicle. The hybrid vehicle, however, may be a series hybrid vehicle or a parallel hybrid vehicle.

Referring to FIG. 1, hybrid power output device 100 includes an engine ENG, a battery B, an inverter INV, a boost converter 12, wheels WH, a trans axle 20, and an ECU (Electric Control Unit) 90.

Engine ENG generates driving force, using combustion energy of fuel such as gasoline as the source. Battery B supplies DC power to a power line. As battery B, a nickel hydride or lithium ion secondary battery or a fuel cell may be used. Further, as an electric storage in place of battery B, a capacitor of large capacity such as an electric double layer capacitor may be used.

Inverter INV converts the DC power supplied from battery B through boost converter 12 to power line 81 to an AC power and outputs it to power line 83. Alternatively, inverter INV converts an AC power supplied to power line 83 to a DC power and outputs it to power line 81.

Trans axle 20 includes, as an integral structure, a transmission and an axle, and has a power split device PSD, a reduction device RD, motor generators MG1 and MG2, and a power control unit 21 controlling motor generators MG1 and MG2. According to the present invention, power control unit 21, which has conventionally been housed in a case independent from trans axle 20, is integrated with trans axle 20 and housed in one same case.

Power split device PSD splits the driving force generated by engine ENG to a path transmitting the force to a vehicle driving shaft through reduction device RD, and a path transmitting the force to motor generator MG1.

Each of motor generators MG1 and MG2 may function as a power generator and an electric motor. Generally, motor generator MG1 operates mainly as a power generator and, hence, it is sometimes referred to as a "power generator". Motor generator MG2 mainly operates as an electric motor and, hence, it is sometimes referred to as an "electric motor."

Motor generator MG1 generates electric power as it is rotated by the driving force from engine ENG, transmitted through power split device PSD. The electric power generated by motor generator MG1 is supplied through power line 82 to inverter INV, and used as electric power for charging battery B or as electric power for driving motor generator MG2.

Motor generator MG2 is driven and rotated by the AC electric power supplied from inverter INV to power line 83. The driving force generated by motor generator MG2 is transmitted through reduction device RD to the driving shaft. Wheels (not shown) other than the wheels driven by the driving shaft may simply be driven wheels, or they may be adapted to be driven by a separate motor generator, not shown, to realize a so-called four-wheel driving system.

When the motor generator MG2 is rotated as the wheel speed reduces during regenerative operation, the electromotive force (AC electric power) generated in motor generator MG2 is supplied to power line 83. In that case, inverter INV converts the electric power supplied to power line 83 to DC power and outputs it to power line 81, whereby battery B is charged.

ECU 90 controls the overall operation of equipment/circuit group mounted on the vehicle such that the vehicle, on which hybrid power output device 100 is mounted, is driven in accordance with instructions from the driver. Typically, ECU 90 is formed by a microcomputer and a memory (RAM, ROM or the like) for executing pre-programmed prescribed sequences and prescribed operations.

Figure 2:
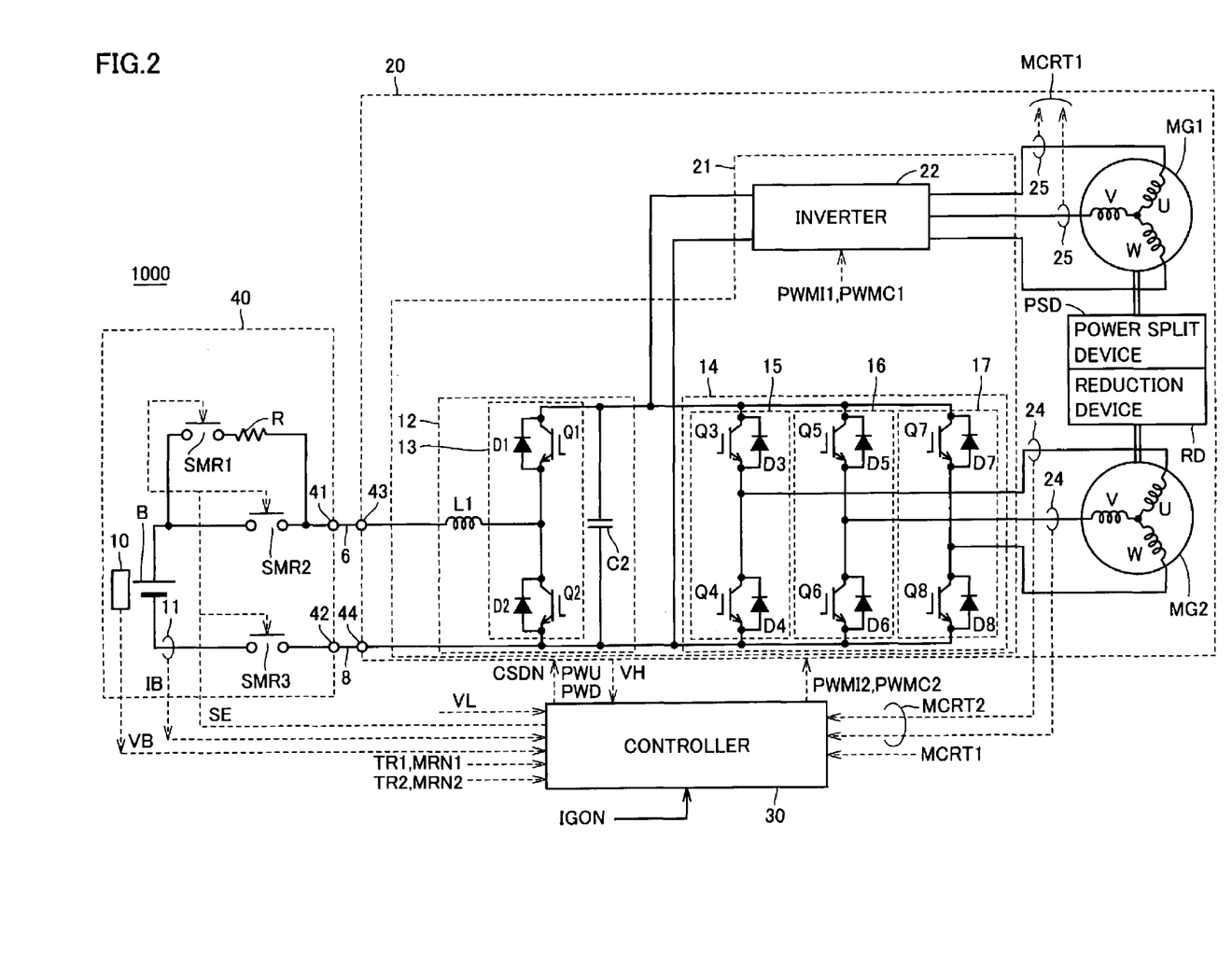
FIG. 2 is a circuit diagram showing a configuration related to motor generator control in the vehicle on which the hybrid power output device of FIG. 1 is mounted.

FIG. 2 is a circuit diagram representing a configuration related to the motor generator control in the vehicle on which hybrid power output device of FIG. 1 is mounted.

Referring to FIG. 2, a vehicle 1000 includes a battery unit 40, trans axle 20, a controller 30 and an engine and wheels, not shown.

Trans axle 20 includes motor generators MG1 and MG2, power split device PSD, reduction device RD, and power control unit 21 controlling motor generators MG1 and MG2.

Power split device PSD is a mechanism coupled to engine ENG and motor generators MG1 and MG2, splitting power among these. By way of example, as power split device PSD, a planetary gear mechanism having three rotation shafts of sun gear, planetary gear and ring gear, may be used.

A structure may be possible in which two rotation axes (planetary gear, sun gear) of power split device PSD are connected to rotation shafts of engine ENG and motor generator MG1, respectively, and the other rotation shaft (ring gear) is connected to motor generator MG2 directly or through reduction device RD.

The rotation shaft of reduction device RD is coupled to the wheels by a reduction gear or a differential gear, not shown, as will be described later.

Battery unit 40 is provided with terminals 41 and 42. Further, trans axle 20 is provided with terminals 43 and 44. Vehicle 1000 further includes a power cable 6 connecting terminals 41 and 43, and a power cable 8 connecting terminals 42 and 44.

Battery unit 40 includes battery B, a system main relay SMR3 connected between the negative pole of battery B and terminal 42, a system main relay SMR2 connected between the positive pole of battery B and terminal 41, and a system main relay SMR1 and a limiting resistor R connected in series between the positive pole of battery B and terminal 41. State of conduction/non-conduction of system main relays SMR1 to SMR3 is controlled in accordance with a control signal SE applied from controller 30.

Battery unit 40 further includes a voltage sensor 10 measuring a voltage VB between terminals of battery B, and a current sensor 11 detecting a current IB flowing to battery B.

Power control unit 21 includes inverters 22 and 14 provided corresponding to motor generators MG1 and MG2, respectively, and a boost converter 12 provided common to inverters 22 and 14. Inverters 22 and 14 constitute inverter INV shown in FIG. 1.

Boost converter 12 boosts the voltage between terminals 43 and 44. Inverter 14 converts the DC voltage applied from boost converter 12 to a three-phase AC and outputs it to motor generator MG2.

Boost converter 12 includes a reactor L1 having one end connected to terminal 43, IGBT elements Q1 and Q2 connected in series between output terminals of boost converter 12 outputting the boosted voltage VH, diodes D1 and D1 connected in parallel with IGBT elements Q1 and Q2 respectively, and a smoothing capacitor C2. Smoothing capacitor C2 smoothes the voltage boosted by boost converter 12.

The other end of reactor L1 is connected to the emitter of IGBT element Q1 and to the collector of IGBT element Q2. Diode D1 has it cathode connected to the collector of IGBT element Q1, and its anode connected to the emitter of IGBT element Q1. Diode D2 has its cathode connected to the collector of IGBT element Q2 and its anode connected to the emitter of IGBT element Q2.

Inverter 14 converts the DC voltage output from boost converter 12 to three-phase AC and outputs it to motor generator MG2 driving the wheels. Further, in regenerative braking, inverter 14 returns power generated by motor generator MG2 to boost converter 12. At this time, boost converter 12 is controlled by controller 30 such that it operates as a voltage lowering circuit.

Inverter 14 includes a U-phase arm 15, a V-phase arm 16, and a W-phase arm 17. U-phase, V-phase, and W-phase arms 15, 16 and 17 are connected in parallel between output lines of boost converter 12.

U-phase arm 15 includes series-connected IGBT elements Q3 and Q4 and diodes D3 and D4 connected in parallel with IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes series-connected IGBT elements Q5 and Q6 and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6 and its anode connected to the emitter of IGBT element Q6.

W-phase arm 17 includes series-connected IGBT elements Q7 and Q8 and diodes D7 and D8 connected in parallel with IGBT elements Q7 and Q8, respectively. Diode D7 has its cathode connected to the collector of IGBT element Q7 and its anode connected to the emitter of IGBT element Q7. Diode D8 has its cathode connected to the collector of IGBT element Q8 and its anode connected to the emitter of IGBT element Q8.

The mid point of the arm of each phase is connected to the end of each phase of each coil of motor generator MG2. Specifically, motor generator MG2 is a three-phase, permanent magnet synchronous motor, and three coils of U, V and W phases each have one end connected together to a neutral point. The other end of U-phase coil is connected to a connection node of IGBT elements Q3 and Q4. The other end of V-phase coil is connected to the connection node of IGBT elements Q5 and Q6. The other end of W-phase coil is connected to the connection node of IGBT elements Q7 and Q8.

Current sensor 24 detects a current flowing through motor generator MG2 as a motor current value MCRT2, and outputs the motor current value MCRT2 to controller 30.

Inverter 22 is connected to boost converter 12 in parallel with inverter 14. Inverter 22 converts the DC voltage output from boost converter 12 to three-phase AC and outputs the same to motor generator MG1. Receiving the boosted voltage from boost converter 12, inverter 22 drives motor generator MG1, for example, to start the engine.

Further, inverter 22 supplies the power generated by motor generator MG1 by the rotary torque transmitted from a crank shaft of the engine to motor generator MG2 or to battery B. At this time, boost converter 12 is controlled by controller 30 such that it operates as a voltage lowering circuit.

Though not shown, internal configuration of inverter 22 is the same as that of inverter 14 and, therefore, detailed description thereof will not be repeated.

Controller 30 receives torque command values TR1 and TR2, motor rotation numbers MRN1 and MRN2, values of voltages VB, VL and VH and of current IB, the motor current values MCRT1 and MCRT2, and an activation signal IGON.

Here, torque command value TR1, motor rotation number MRN1 and motor current value MCRT1 are related to motor generator MG1, and torque command value TR2, motor rotation number MRN2 and motor current value MCRT2 are related to motor generator MG2.

Further, voltage VB is the voltage of battery B, and current IB is the current flowing through battery B. Voltage VL is the voltage before boosting by boost converter 12, and voltage VH is the voltage after boosting by boost converter 12.

Controller 30 outputs a control signal PWU instructing boost converter 12 to boost the voltage, a control signal PWD to lower the voltage, and a signal CSDN instructing an operation inhibition.

Further, controller 30 outputs, to inverter 14, a driving instruction PWMI2 for converting the DC voltage as an output of boost converter 12 to an AC voltage for driving motor generator MG2, and a regeneration instruction PWMC2 for converting an AC voltage generated by motor generator MG2 to a DC voltage and returning the same to the side of boost converter 12.

Similarly, controller 30 outputs, to inverter 22, a driving instruction PWMI1 for converting the DC voltage to an AC voltage for driving motor generator MG1, and a regeneration instruction PWMC1 for converting an AC voltage generated by motor generator MG1 to a DC voltage and returning the same to the side of boost converter 12.

Figure 3:
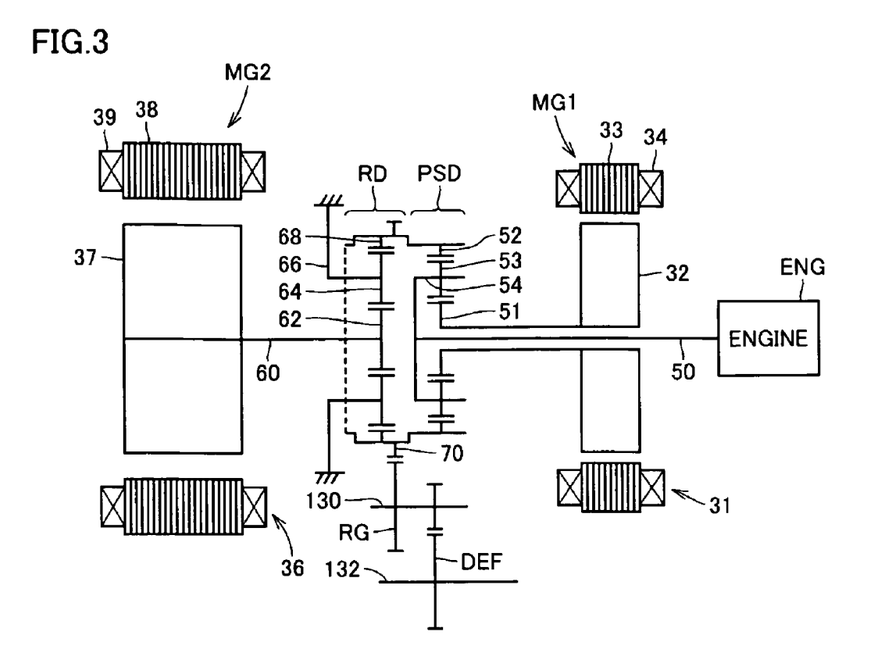
FIG. 3 is an illustration representing details of the power split device and the reduction device shown in FIG. 2.

FIG. 3 is an illustration representing details of the power split device PSD and the reduction device RD shown in FIG. 2.

Referring to FIG. 3, the hybrid power output device in accordance with the present invention includes a motor generator MG2, a reduction device RD connected to the rotation shaft of motor generator MG2, an axle that rotates along with the rotation of the rotation shaft reduced by reduction device RD, engine ENG, motor generator MG1, and power split device PSD for distributing power among reduction device RD, engine ENG and motor generator MG1. Reduction ratio of reduction device RD from motor generator MG2 to power split device PSD is, for example, at least twice.

A crank shaft 50 of engine ENG, a rotor 32 of motor generator MG1 and a rotor 37 of motor generator MG2 rotate about the same axis.

Power split device PSD is, in the example shown in FIG. 3, a planetary gear, including: a sun gear 51 coupled to a hollow sun gear shaft, with a crank shaft 50 passing through the center of the shaft; a ring gear 52 rotatably supported on the same axis as crank shaft 50; a pinion gear 53, arranged between sun gear 51 and ring gear 52, rotating and revolving around an outer circumference of sun gear 51; and a planetary carrier 54 coupled to an end portion of crank shaft 50 and supporting axis of rotation of each pinion gear 53.

In power split device PSD, three shafts, that is, a sun gear shaft coupled to sun gear 51, a ring gear case coupled to ring gear 52, and a crank shaft 50 coupled to planetary carrier 54 serve as power input/output shafts. When power input to/output from two of the three shafts is determined, the power to be input to/output from the remaining one shaft is determined based on the power input to/output from the other two shafts.

A counter drive gear 70 for taking out power is provided on the outside of ring gear case, and rotates integrally with ring gear 52. Counter drive gear 70 is connected to power transmission reduction gear RG. Power is transmitted between counter drive gear 70 and power transmission reduction gear RG. Power transmission reduction gear RG drives a differential gear DEF. Further, driving down hill, rotation of wheels is transmitted to differential gear DEF, and power transmission reduction gear RG is driven by differential gear DEF.

Motor generator MG1 includes a stator 31 forming a rotating magnetic field, and a rotor 32 arranged in stator 31 and having a plurality of permanent magnets embedded therein. Stator 31 includes a stator core 33 and a three-phase coil 34 wound around stator core 33. Rotor 32 is coupled to the sun gear shaft that rotates integrally with sun gear 51 of power split device PSD. Stator core 33 is formed by stacking thin electromagnetic steel sheets and fixed in a case, not shown.

Motor generator MG1 operates as an electric motor for rotating and driving rotor 32 by an interaction between a magnetic field formed by the permanent magnets embedded in rotor 32 and a magnetic field formed by three-phase coil 34. Further, motor generator MG1 operates as a power generator generating an electromotive force at opposite ends of three-phase coil 34 by the interaction between the magnetic field of permanent magnets and the rotation of rotor 32.

Motor generator MG2 includes a stator 36 forming a rotating magnetic field, and a rotor 37 arranged in stator 31 and having a plurality of permanent magnets embedded therein. Stator 36 includes a stator core 38 and a three-phase coil 39 wound around stator core 38.

Rotor 37 is coupled to a ring gear case rotating integrally with ring gear 52 of power split device PSD through reduction device RD. Stator core 38 is formed by stacking thin electromagnetic steel sheets and fixed in a case, not shown.

Motor generator MG2 also operates as a power generator generating an electromotive force at opposite ends of three-phase coil 39 by the interaction between the magnetic field of permanent magnets and the rotation of rotor 37. Further, motor generator MG2 also operates as an electric motor for rotating and driving rotor 37 by an interaction between a magnetic field formed by the permanent magnets and a magnetic field formed by three-phase coil 39.

Reduction device RD performs speed reduction by the structure in which planetary carrier 66 as one of rotating elements of the planetary gear is fixed on a case of the trans axle. Specifically, reduction device RD includes sun gear 62 coupled to the shaft of rotor 37, a ring gear 68 rotating integrally with ring gear 52, and a pinion gear 64 engaged with ring gear 68 and sun gear 62, for transmitting rotation of sun gear 62 to ring gear 68.

By way of example, by setting the number of teeth of ring gear 68 twice as large as the number of teeth of sun gear 62, the reduction ratio can be set twice or higher.

[Description of Component Arrangement]

Figure 4:
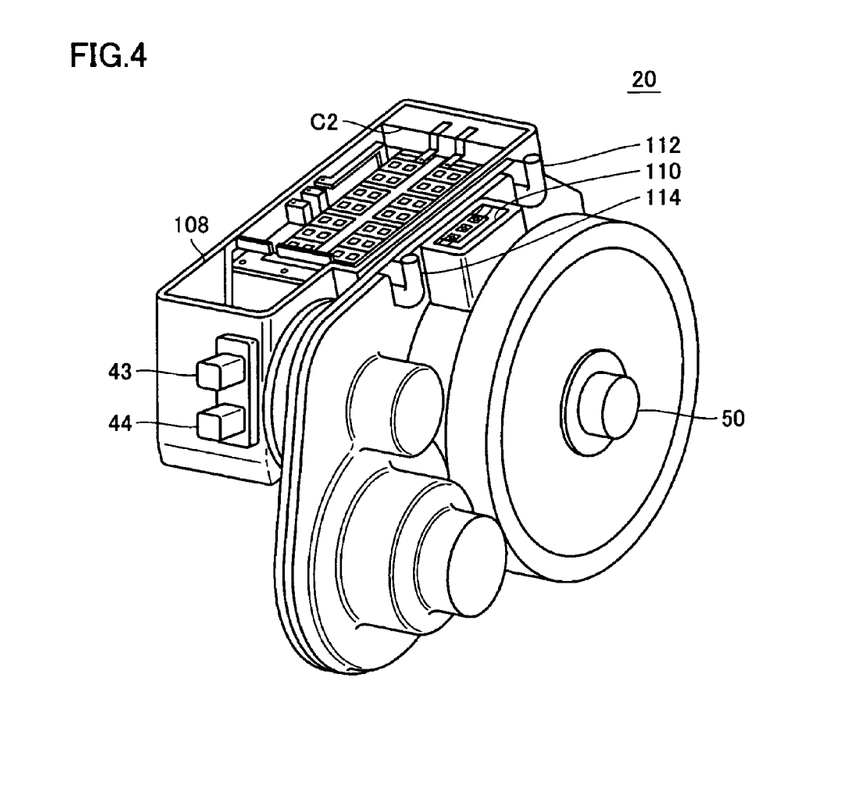
FIG. 4 is a perspective view showing an appearance of a trans axle of the hybrid vehicle in accordance with an embodiment of the present invention.

FIG. 4 is a perspective view showing an appearance of trans axle of the hybrid vehicle in accordance with an embodiment of the present invention.

Figure 5:
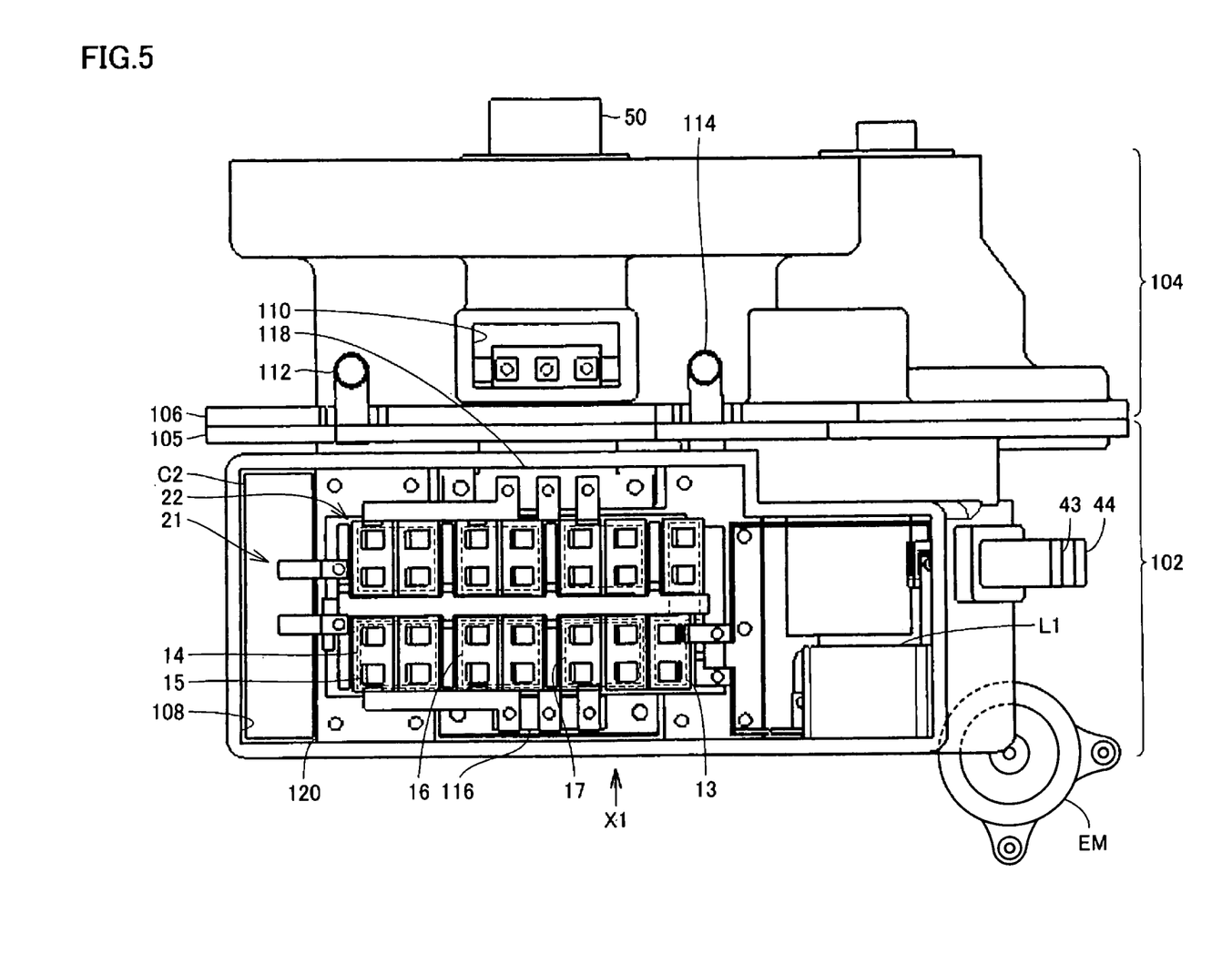
FIG. 5 is a plan view of the trans axle.

FIG. 5 is a plan view of trans axle 20.

Referring to FIGS. 4 and 5, the case of trans axle 20 is formed dividable into a case 104 and a case 102. Case 104 is mainly for housing motor generator MG1, and case 102 is mainly for housing motor generator MG2 and the power control unit.

A flange 106 is formed on case 104, and a flange 105 is formed on case 102, and flanges 106 and 105 are fixed by means of a bolt or the like, whereby cases 104 and 102 are integrated.

Case 102 is provided with an opening 108 for mounting power control unit 21. On the inner left side (in the direction of vehicle travel) of opening 108, capacitor C2 is housed, and on the right side, reactor L1 is housed. When mounted on the vehicle, opening 108 is closed by a lid. It is noted that arrangement may be reversed such that capacitor C2 is positioned on the right side and reactor L1 is positioned on the left side.

Specifically, reactor L1 is positioned on one side of the rotating shafts of motor generators MG1 and MG2, and capacitor C2 is positioned on the other side. In the area between capacitor C2 and reactor L1, a power element substrate 120 is arranged. Below power element substrate 120, motor generator MG2 is arranged.

On power element substrate 120, inverter 22 controlling motor generator MG1, inverter 14 controlling motor generator MG2, and an arm portion 13 of the boost converter are mounted.

In the area between inverters 14 and 22, power supplying bus bars are arranged overlapped in vertical direction. One bus bar is extended from each of U-phase arm 15, V-phase arm 16 and W-phase arm 17 of inverter 14, to a terminal base 116 connected to the stator coil of motor generator MG2. Similarly, three bus bars are extended from inverter 22 to terminal base 118 connected to the stator coil of motor generator MG1.

Power element substrate 120 attains to a high temperature and, therefore, a water path is provided below power element substrate 120 for cooling, and a cooling water inlet 114 and cooling water outlet 112 to/from the water path are provided on case 102. The inlet and outlet may be formed by driving a union nut or the like to case 102, through flanges 106 and 105.

The voltage applied from battery unit 40 of FIG. 3 to terminals 43 and 44 through the power cable is boosted by boost converter 12 including reactor L1 and arm portion 13. The boosted voltage is smoothed by capacitor C2 and supplied to inverters 14 and 22.

As the battery voltage is used boosted by boost converter 12, it becomes possible to drive the motor generator with a high voltage exceeding 500V, while the battery voltage is reduced to about 200V. Consequently, power loss can be reduced as the power can be supplied with small current, and high output of motor can be realized.

If the inverters 14 and 22, motor generators MG1 and MG2 and, in addition, boost converter 12 are to be integrated as trans axle 20, arrangement of reactor L1 and capacitor C2, which are relatively large components, poses a problem.

Figure 6:
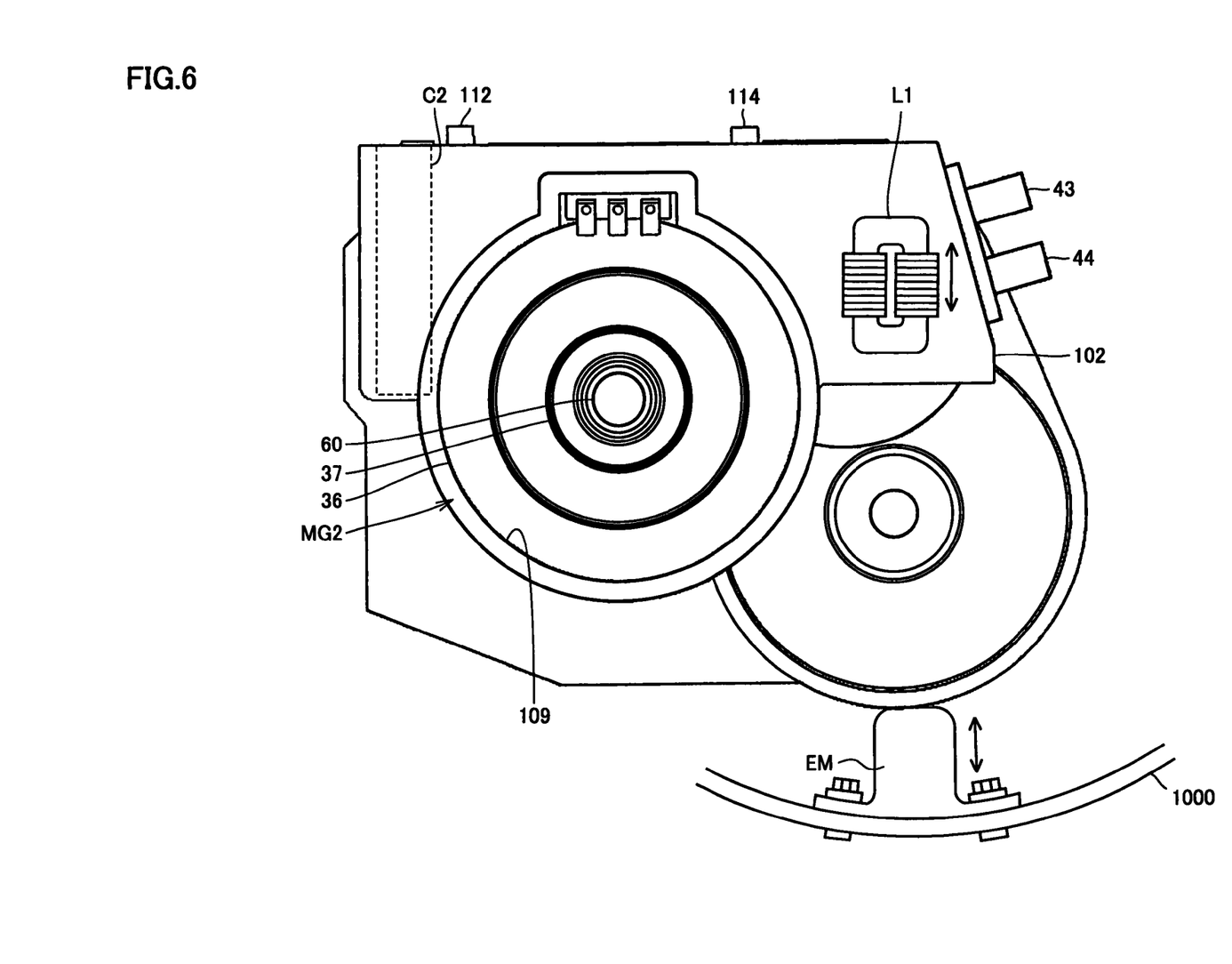
FIG. 6 is a side view of the trans axle viewed from the direction X1 of FIG. 5.

FIG. 6 is a side view of trans axle 20 viewed from the direction X1 of FIG. 5.

Referring to FIG. 6, on case 102, an opening 109 for mounting and maintaining motor generator is provided. When mounted on the vehicle, opening 109 is closed by a lid.

Inside the opening 109, motor generator MG2 is placed. Rotor 37 is arranged in stator 36, to which bus bars of U, V and W phases are connected. At the central portion of rotor 37, a hollow shaft 60 can be seen.

As shown in FIG. 5, stator 36 of motor generator MG2 significantly breaks into the housing chamber of case 102 in which power control unit 21 is housed, and reactor L1 is arranged on one side and capacitor C2 is arrange on the other side of motor generator MG2, whereby large components are packed efficiently. Thus, a compact trans axle of a hybrid vehicle is realized.

Further, according to the present invention, as the trans axle is integrated with power control unit 21, propagation of vibration generated at reactor L1 to the body of hybrid vehicle can be reduced, as will be described later.

Figure 7:
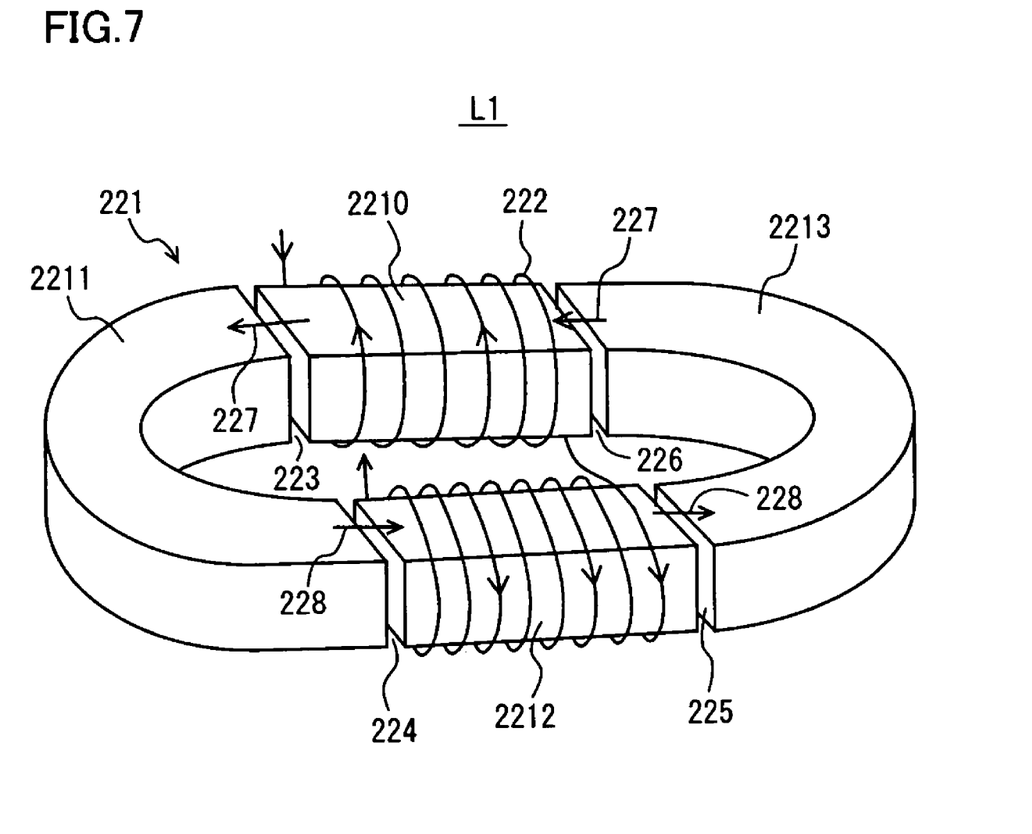
FIG. 7 is a perspective view of the reactor shown in FIG. 6.

Specifically, reactor L1 includes a core 221 and a coil 222, as shown in FIG. 7. Core 221 has linear portions 2210 and 2220 and curved portions 2211 and 2213.

There is a gap 223 between curved portion 2211 and linear portion 2210, and gap 224 between curved portion 2211 and linear portion 2212. There is a gap 225 between curved portion 2213 and linear portion 2212, and gap 226 between curved portion 2213 and linear portion 2210. Coil 222 is wound around linear portions 2210 and 2212.

When a DC current flows through coil 222 in the direction represented by the arrows, magnetic flux generates in core 221, and the generated magnetic flux passes through gap 223 in the direction of arrow 227 and propagates through curved portion 2211. Then, the magnetic flux passes through gap 224 in the direction of arrow 228 and propagates through linear portion 2212, and further passes the gap 225 in the direction of arrow 228. Then, the magnetic flux further propagates through curved portion 2213 and gap 226 in the direction of arrow 227. In this manner, when a DC current flows through coil 222, the magnetic flux circulates through core 221.

Again referring to FIGS. 2 and 5, when power control unit 21 drives motor generators MG1 and MG2, IGBT element Q2 of boost converter 12 is turned ON/OFF as described above. When IGBT element Q2 is turned on, a DC current flows through a closed circuit consisting of power cable 6, reactor L1, IGBT element Q2, power cable 8 and battery B. A magnetic flux generates at core 221 of reactor L1, and curved portions 2211 and 2213 are pulled by attracting force to the linear portions 2210 and 2212. When IGBT element Q2 is turned off, magnetic flux is not generated at core 221 and therefore, curved portions 2211 and 2213 are not pulled from linear portions 2210 and 2212.

Therefore, as the IGBT element Q2 is turned ON/OFF, curved portions 2211 and 2213 of core 221 of reactor L1 move to liner portions 2210 and 2212 and return to the original positions, causing vibration.

As reactor L1 is fixed on opening 108 of case 102, the vibration generated at reactor L1 propagates to case 102. Further, the vibration propagates to the body, through a fixing member fixing the case 102 on the body. As a result, noise caused by the vibration of reactor L1 is generated in vehicle interior.

Now, generally in a vehicle having an engine mounted thereon, the engine is suspended on the body using an anti-vibration device called an engine mount, in order to prevent generation of noise by the engine vibration propagating to the body. Here, the trans axle directly coupled to the engine receives engine vibration and vibrates itself, and therefore, the trans axle is also suspended, integrated with the engine, on the body by means of the engine mount.

The engine mount is formed of an elastic body such as a liquid-seal type rubber bush. As the liquid moves in the rubber of the engine mount, inherent elasticity of rubber is supplemented, and relative vibration of the engine to the body can be absorbed.

According to the present invention, reactor L1 as a vibration source is integrated with trans axle 20, and therefore, the above-described vibration of reactor L1 can be absorbed by the engine mount as the anti-vibration device for the engine.

By optimizing the positional relation between reactor L1 as the vibration source and the engine mount, the vibration of reactor L1 can more efficiently be absorbed.

Specifically, as shown in FIG. 5, an arrangement may be effective in which engine mount EM is positioned close to reactor L1. By this structure, the vibration of reactor L1 is efficiently absorbed by the engine mount EM nearby, and propagation to the body is prevented. Here, if an arrangement in which engine mount EM and reactor L1 vibrate on approximately one line can be realized in an acceptable range, it would be effective to further absorb the vibration of reactor L1.

Further, as shown in FIG. 6, the engine mount EM and reactor L1 are arranged such that the direction of vibration of the elastic body in engine mount is approximately aligned with the direction of vibration of reactor L1.

As described with reference to FIG. 7, reactor L1 vibrates in the direction of arrow LN1, as attracting force acts between the curved portion and the linear portion because of the magnetic flux circulating through core 221. Therefore, when engine mount EM is arranged such that the direction of vibration (corresponding to the direction of arrow LN2) of the elastic body in engine mount EM is approximately aligned to the direction of vibration of reactor L1, the vibration of reactor L1 can efficiently be absorbed.

Further, when the arrangement is such that the direction of vibration of the elastic body in engine mount EM is approximately aligned to the direction of vibration of engine ENG, the vibration damping force of engine mount EM can be fully utilized. In that case, engine mount EM is arranged such that the direction of vibration of the elastic body in engine mount EM is approximately aligned to the direction of vibration of reactor L1 and to the direction of reciprocal operation of a piston in the engine ENG.

As described above, according to the embodiment of the present invention, utilizing the free space of power split device and motor generator MG2 of the trans axle, the power control unit including the inverter and boost converter can be arranged in a compact manner. This realizes a shape close to that of a trans axle portion of a conventional gas-powered vehicle, and therefore, a power output device for a hybrid vehicle that can be mounted on wider variety of models can be realized.

Further, the vibration generated at the reactor of boost converter in the power control unit can be absorbed by an existing anti-vibration device for absorbing the engine vibration. As a result, less vibration of reactor is propagated to the body, preventing generation of noise in the vehicle interior.

Further, by arranging the anti-vibration device near the reactor as the vibration source with the directions of vibration of the components approximately aligned, the reactor vibration can more efficiently be suppressed. Here, by arranging the anti-vibration device such that directions of vibration of reactor and engine are approximately aligned, the vibration damping force of engine mount EM can fully be exhibited.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a power output device mounted on a hybrid vehicle.

The invention claimed is:

1. A power output device of a hybrid vehicle outputting power to a driving shaft, comprising:
    an engine generating power using fuel combustion energy as a source;
    a power transmission device combining the power generated by said engine with power generated by a rotating electrical machine and transmitting the combined power to said driving shaft;
    a power control unit including a switching element and a reactor, for power conversion between a DC electric power from a power source and an AC electric power driving and controlling said rotating electrical machine by a switching operation of said switching element;
    a case coupled to said engine to allow transmission of vibration, and housing said power transmission device and said power control unit; and
    an anti-vibration device suspending said engine and said case on a vehicle body such that a direction of vibration of said engine and a direction of vibration of said anti-vibration device are in substantially the same direction providing absorption of relative vibration between said engine and the vehicle body,
    wherein said anti-vibration device has an elastic body allowing vibration, coupled between said engine, said case, and said vehicle body, and provided such that a direction of vibration of said elastic body is approximately the same as a direction of vibration of said reactor when power is conducted, and
    wherein said anti-vibration device is provided such that said elastic body and said reactor overlap in a vertical plane and vibrate approximately on one same line.

2. The power output device of a hybrid vehicle according to claim 1, wherein
    said power transmission device includes
    first and second rotating electrical machines driven by said power source and generating power, and
    a power split device mechanically distributing an output of said engine to said first rotating electrical machine and said driving shaft; and
    said power control unit includes
    first and second inverters provided corresponding to said first and second rotating electrical machines, and
    a voltage converter having said switching element and said reactor, performing voltage conversion between said power source and said first and second inverters, by the switching operation of said switching element.

3. The power output device of a hybrid vehicle according to claim 2, wherein
    a current switched by said switching element flows through said reactor.

4. The power output device of a hybrid vehicle according to claim 3, wherein said anti-vibration device is provided such that the direction of vibration of said elastic body is approximately the same as the direction of vibration of said engine and the direction of vibration of said reactor when power is conducted.

* * * * *